(12) United States Patent
Deng et al.

(10) Patent No.: US 11,402,543 B2
(45) Date of Patent: Aug. 2, 2022

(54) ALL SILICON BROADBAND ULTRA-VIOLET METASURFACES

(71) Applicant: THE REGENTS OF THE UNIVERSITY OF CALIFORNIA, Oakland, CA (US)

(72) Inventors: Yang Deng, Fremont, CA (US); Xi Wang, Newark, DE (US); Zilun Gong, Berkelely, CA (US); Jie Yao, Fremont, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 185 days.

(21) Appl. No.: 16/506,043

(22) Filed: Jul. 9, 2019

(65) Prior Publication Data

US 2020/0018871 A1 Jan. 16, 2020

Related U.S. Application Data

(60) Provisional application No. 62/697,914, filed on Jul. 13, 2018.

(51) Int. Cl.
| | | |
|---|---|---|
| *G02B 1/00* | (2006.01) | |
| *G02B 1/04* | (2006.01) | |
| *G02B 1/10* | (2015.01) | |
| *G02B 5/28* | (2006.01) | |

(52) U.S. Cl.
CPC ............. *G02B 1/002* (2013.01); *G02B 1/041* (2013.01); *G02B 1/10* (2013.01); *G02B 5/283* (2013.01)

(58) Field of Classification Search
CPC .......... G02B 1/002; G02B 1/041; G02B 1/10; G02B 5/283
See application file for complete search history.

(56) References Cited

U.S. PATENT DOCUMENTS

2017/0322418 A1* 11/2017 Lin .......................... G02B 5/30

OTHER PUBLICATIONS

Zhenpeng Zhou, Juntao Li,Rongbin Su, Beimeng Yao,Hanlin Fang, Kezheng Li, Lidan Zhou, Jin Liu, Daan Stellinga, Christopher P. Reardon, Thomas F. Krauss, and Xuehua Wang, Efficient Silicon Metasurfaces for Visible Light,ACS Photonics 2017, 4, 544-551 (Year: 2017).*
Dianmin Lin, Pengyu Fan, Erez Hasman, Mark L. Brongersma,Dielectric gradient metasurface optical elements, Science, 2014, vol. 345 Issue 6194, 298-301. (Year: 2014).*
Berry, M.V., "The adiabatic phase and Pancharatnam's phase for polarized light," J. Modern Optics, 1987, vol. 23, No. 1, pp. 1401-1407.
Eggleston, et al.,"Optical antenna enhanced spontaneous emission," PNAS, Feb. 10, 2015, vol. 112, No. 6, pp. 1704-1709.

(Continued)

*Primary Examiner* — Bijan Ahvazi
(74) *Attorney, Agent, or Firm* — Miller Nash LLP

(57) ABSTRACT

A device has a substrate transparent to ultraviolet (UV) light, and at least one metalens formed of a material having large permittivity of UV light on the substrate. A device has a UV reflector, a UV transparent film on the reflector, and at least one metalens formed of a material having large permittivity of UV light on the film.

5 Claims, 8 Drawing Sheets

(56) References Cited

OTHER PUBLICATIONS

Khorasaninejad, et al., "Metalenses at visible wavelengths: Diffraction-limited focusing and subwavelength resolution imaging," Science, Jun. 3, 2016, vol. 352, Issue 6290, pp. 1190-1194.
Lin et al., "Dielectric gradient megasurface optical elements," Science, Jul. 18, 2014, vol. 344, Issue 6194, pp. 300-202.
Pancharatnam, S., "Generalized Theory of Interference and its Applications, Part II. Partially Coherent Pencils", Memoir No. 92 of the Raman Research Institute, Banglaore-6, Nov. 17, 1956.
Zheng, et al., "Metasurface holograms reaching 80% efficiency," Nature Nanotechnology, Letters, Feb. 23, 2015, pp. 1-5.

* cited by examiner

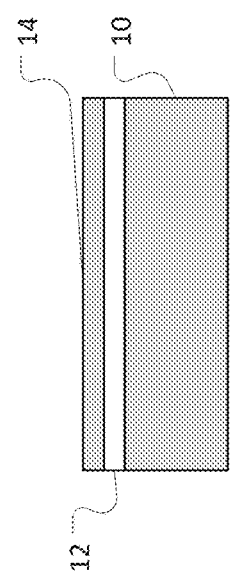
FIGURE 9
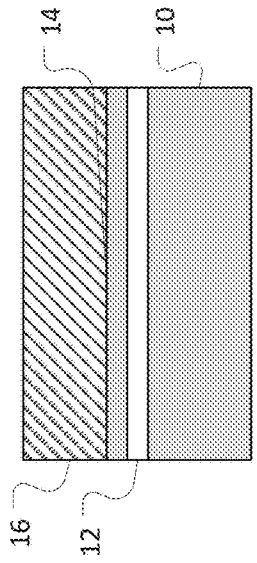
FIGURE 10
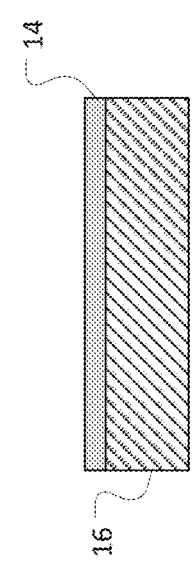
FIGURE 11
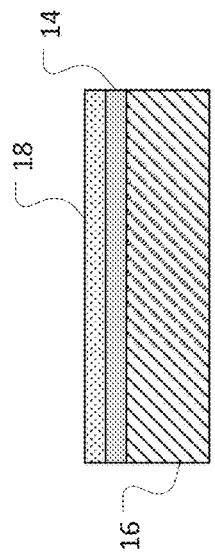
FIGURE 12
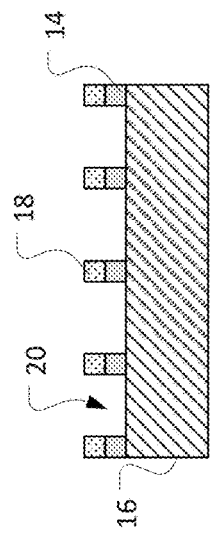
FIGURE 13
FIGURE 14

ALL SILICON BROADBAND ULTRA-VIOLET METASURFACES

CROSS REFERENCE TO RELATED APPLICATION

This application claims priority to and the benefit of U.S. Provisional Application No. 62/697,914 filed Jul. 13, 2018, which is incorporated herein by reference in its entirety.

STATEMENT REGARDING FEDERALLY SPONSORED RESEARCH AND DEVELOPMENT

This invention was made with government support under Grant Number 1555336 awarded by the National Science Foundation. The government has certain rights in the invention.

BACKGROUND

Conventional ultraviolet (UV) lenses rely on manipulating the optical phase by changing the thickness of UV transparent materials to generate different optical paths from the center to the edge of the lens. These lenses typically consist of UV transparent materials and are robust. However, compactly integrated systems cannot include these traditional lenses with macroscopic thicknesses. Additionally, most of the widely used materials such as $MgF_2$, and $CaF_2$, lack compatibility with CMOS processes.

BRIEF DESCRIPTION OF THE DRAWINGS

FIGS. 9-15 show an embodiment of a process of manufacturing embodiments of a single bar metasurface.

DETAILED DESCRIPTION OF THE EMBODIMENTS

Figure 1B:
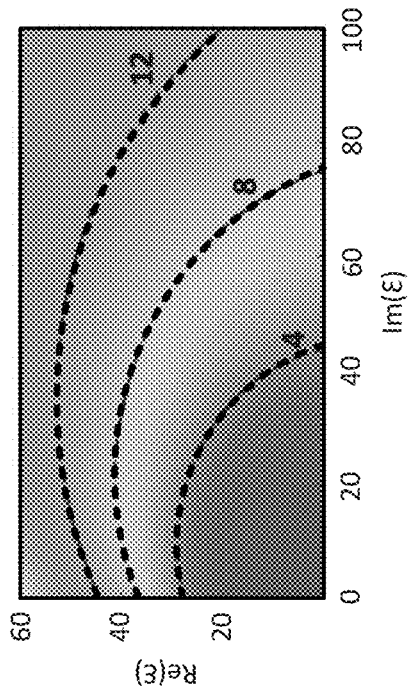
FIGS. 1A-1D shows a circuit model for lossy dielectric nanorod and calculated scattering efficiency comparison between different materials.

The embodiments here provide a new platform for building all-silicon (Si) metasurfaces in the ultraviolet (UV) range with thicknesses smaller than the working wavelength to manipulate broadband UV light with efficiencies higher than 10%. Other than silicon, indications are that other materials with large permittivity in the UV range, such as many oxides, nitrides and carbides, may also make good candidates for metasurface devices in the UV realm. Examples include, but are not limited to, silicon dioxide ($SiO_2$) and silicon carbide (SiC). Large permittivity in the UV range is related to strong absorption in the UV range, and as used here means materials with a large imaginary part of permittivity and therefore an associated large, real part of permittivity. Large as used here means any value greater than 10.

A 'metasurface' as used here consists of a surface of a metamaterial, which is a flat optical device that exhibits special properties as a consequence of the metamaterial's structure at the microscopic or macroscopic level. In the embodiments here, the metamaterial consists of silicon or other materials with large permittivity in the UV range. One should note that while the discussion and examples here focus on silicon, no limitation to silicon is intended nor should any be implied.

The embodiments here rely upon a widely utilized and CMOS (complementary metal oxide semiconductor) compatible material, silicon, and the working wavelength covers from 290 nanometers (nm) to 410 nm, which can be further extended with materials beyond silicon. One application of these embodiments lies in thin metalenses for high-resolution imaging and lithography in the UV range.

An all-Si metalens overcomes the limitations of conventional lenses and allows ready integration and fabrication on a chip with common CMOS technologies in industry. This leads to cost-effective and massive, or large-scale, fabrication. The ultra-compact and easy to manufacture metalenses apply to both regular optical setups and integrated photonic circuits. The thinness of the metalens makes it suitable for general imaging systems, such as smart phone cameras with significantly reduced device thickness. The UV signature of these lenses enables its use as possible replacements in traditional projection lenses in high-resolution lithography stepper machinery.

FIG. 1 shows a circuit model for a lossy dielectric nanorod and calculated scattering efficiency comparison between different materials. FIG. 1A shows a schematic configuration of a nanorod and scattering field. One should note that the circuit model calculation does not include a substrate. FIG. 1B shows color mapping of scattering efficiency of a nanorod as a function of $Re(\varepsilon)$ ($\varepsilon_r$) and $Im(\varepsilon)$ ($\varepsilon_i$), with L equaling 130 nm, W=30 nm, and H=30 nm at the wavelength of 380 nm. FIG. 1C shows a circuit model for a single antenna or 'bar.' FIG. 1D shows $R_{rad}$, $|Z_{tot}|$, and $R_{rad}/|Z_{tot}|$ plotted as a function of $\varepsilon_i$ when $\varepsilon_r$ is fixed at 10, where $R_{rad}$ is the radiation resistance, and $Z_{tot}$ is the total impedance.

Figure 1D:
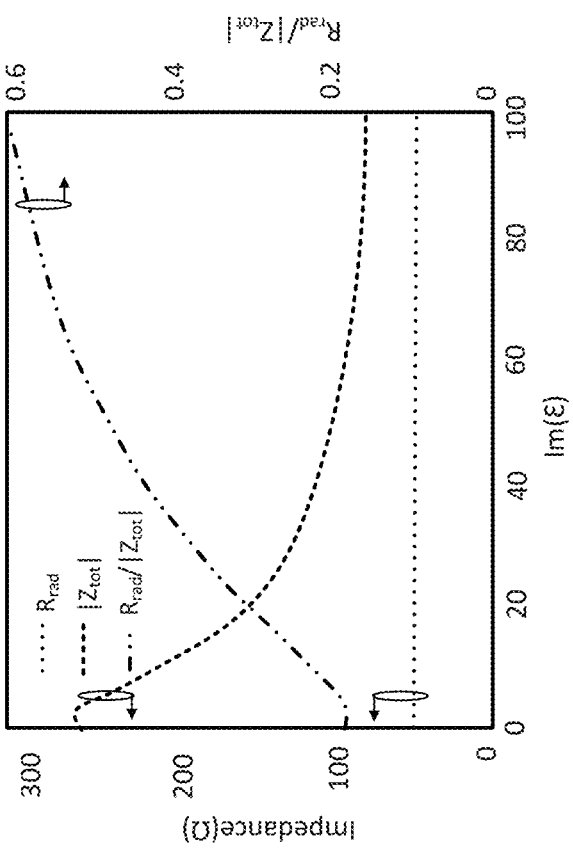
Figure 1A:
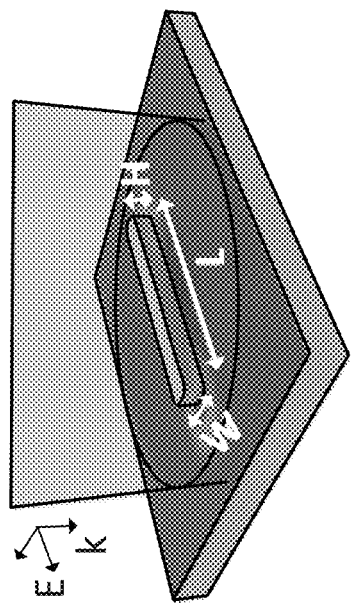
Figure 1C:
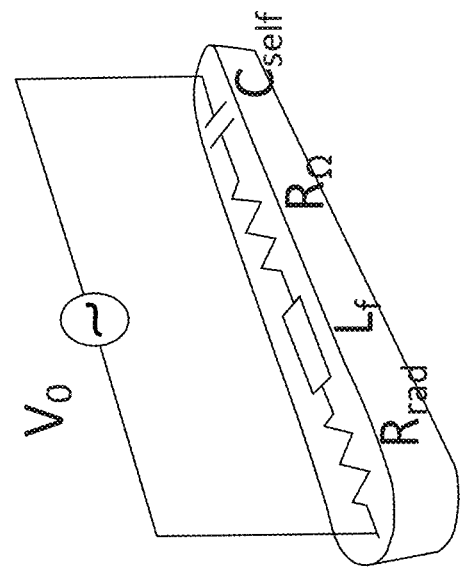

FIG. 1A depicts a single unit of the metasurface in which the environment is air. The scattering efficiency (SE) of a nanorod consisting of a material with arbitrary permittivities of FIG. 1A is investigated. FIG. 1B plots color contour of the SE of a nanorod as a function of the $\varepsilon_r$ and $\varepsilon_i$ at 380 nm. This shows that not only $\varepsilon_r$ but also $\varepsilon_i$ contribute positively to the SE in a dissipative system. Hence, single crystal Si is chosen as the material platform for efficient metasurfaces, due to its large permittivity at UV frequencies, CMOS compatibility and mature fabrication technologies. FIG. 1C shows the circuit model constructed to calculate the SE of a nanorod [M. Eggleston, K. Messer, L. Zhang, E. Yablonovitch, M. Wu, Proc. Nall. Acad. Sci. 2015, 112, 1704.]. The circuit contains an AC voltage source ($V_O$) modeling the incident plane wave. The total impedance, $Z_{tot}$ of a nano-antenna includes radiation resistance ($R_{rad}$), self-inductance in the rod ($L_f$), Ohmic resistance ($R_\Omega$) and self-capacitance ($C_{self}$)

in dielectric materials. The $R_{rad}$ is independent of material permittivities; the energy "lost" to $R_{rad}$ is the scattered energy. FIG. 1D indicates that increasing $\varepsilon_i$ reduces $|Z_{tot}|$ of the circuit while $R_{rad}$ is a constant, resulting in increasing scattering energy ratio. This allows the embodiments to utilize common lossy dielectrics such as Si to realize metasurfaces over a broad range, including the UV region.

Figure 3:
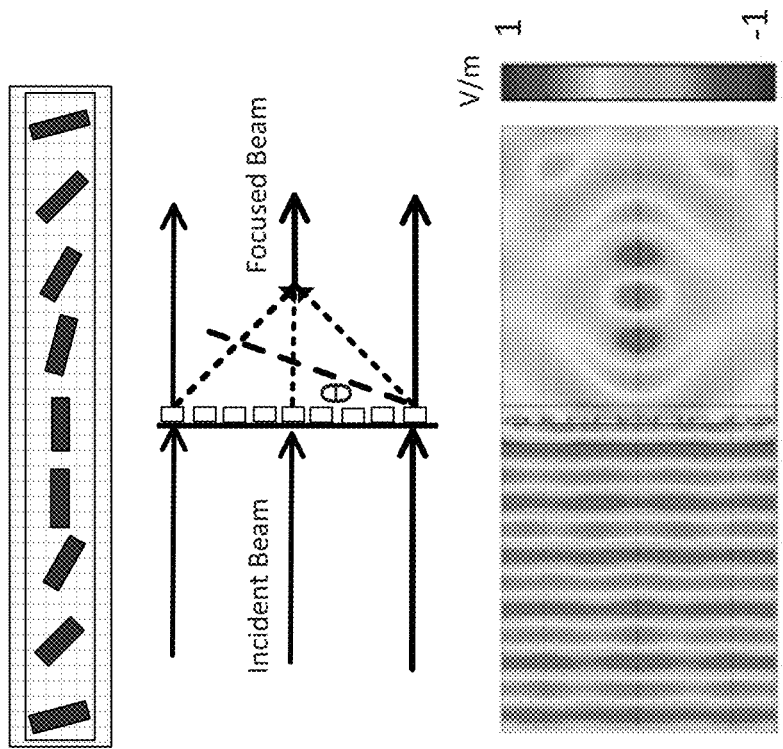
FIG. 3 shows an example of beam focusing using metasurfaces.
Figure 2:
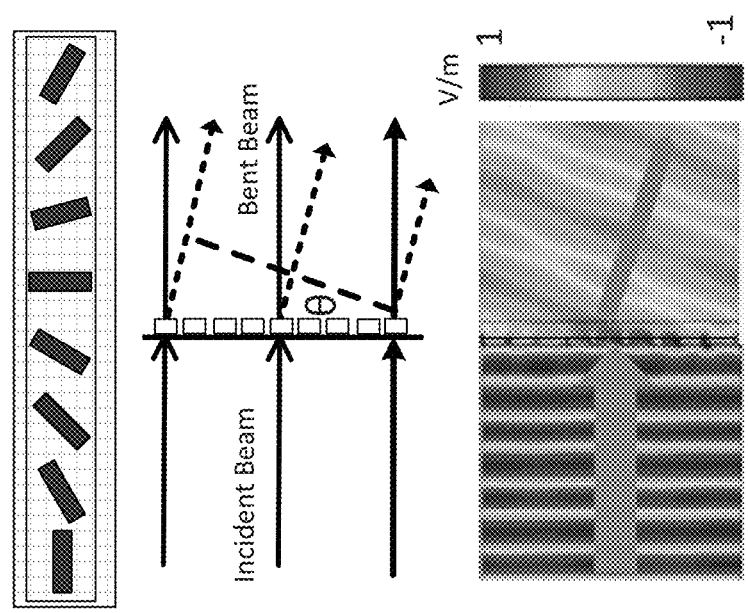
FIG. 2 shows an example of beam steering using metasurfaces.

FIGS. 2-3 show two functionalities achievable by this metasurface: beam steering as shown in FIG. 2 and focusing in FIG. 3. Among metasurface designs, the scatterer-orientation-controlled geometric phase (Pancharatnam-Berry phase) approach has been widely utilized to manipulate the phase of the scattered field for circularly polarized light [M. V. Berry, *J. Mod. Opt.* 1987, 34, 1401; and S. Pancharatnam, *Proceedings of the Indian Academy of Sciences, Section A*, Springer, 1956, 44, 398.] The embodiments here use the same approach of a nanorod-shaped scatterer to control the phase of the scattered light with opposite helicity by only changing the orientation angle of the scatterer. The phase is not subjected to variations in size and material properties, upon which the scattering efficiency is dependent [D. Lin, P. Fan, E. Hasman, M. L. Brongersma, *Science* 2014, 345, 298.; M. Khorasaninejad, W. T. Chen, R. C. Devlin, J. Oh, A. Y. Zhu, F. Capasso, *Science* 2016, 352, 1190.; and G. Zheng, H. Mühlenbernd, M. Kenney, G. Li, T. Zentgraf, S. Zhang, *Nat. Nanotechnol.* 2015, 10, 308.]. This unique feature allows the embodiments to have great freedom in optimizing the efficiency of the nanoantennas without sacrificing the phase control.

Figure 5:
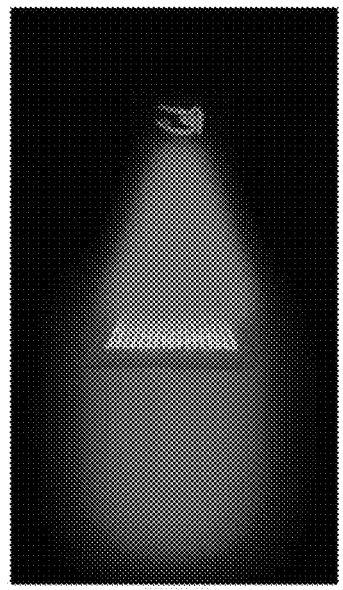
FIG. 5 shows a schematic of a focused UV hologram for lithography.
Figure 4:
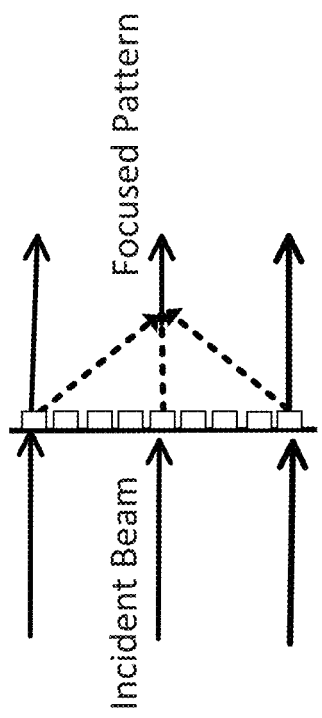
FIG. 4 shows a ray tracing diagram of a focused beam in a focused hologram.

In addition, the embodiments may combine a metalens design and hologram phase distribution to form a focused pattern as shown in the ray tracing diagram of FIG. 4, and a schematic of a focused UV hologram for lithography in FIG. 5. This may find a plethora of applications in projection lenses for maskless lithography steppers, where the mask information is encoded into the metalens.

Figure 6:
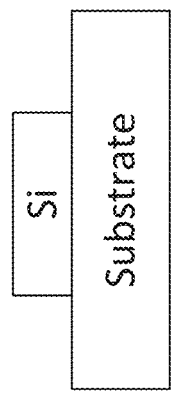
FIG. 6 shows a graph of calculated and measured conversion and diffraction efficiencies for an embodiment of a single-bar metasurface.
Figure 6:
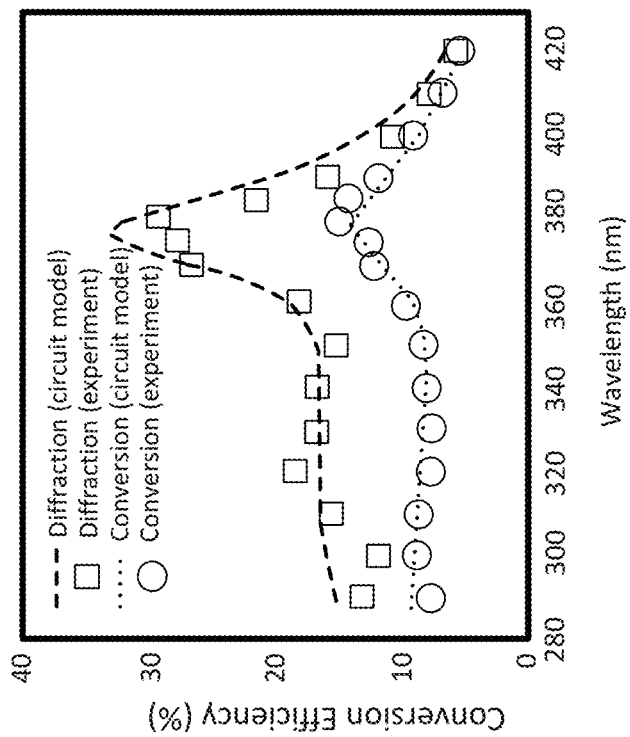

FIG. 6 shows a plot of the conversion efficiency of the metasurfaces, the ratio of the power of the converted beam to the total incident power, and the diffraction efficiency, the ratio of the power of the converted beam to the direct transmitted power for a single bar embodiment. Over a broadband range from 290 nm to 410 nm, the conversion efficiency reaches as high as 15% at 380 nm and remains at the level of 10% even at the short wavelength of 290 nm. The diffraction efficiency achieves 30% around 380 nm and maintains over 15% at shorter wavelengths. The experimental results in FIG. 6 agree with circuit model calculations.

Figure 7:
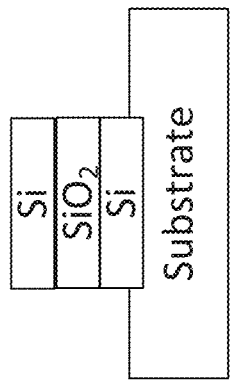
FIG. 7 shows a graph of calculated and measured conversion and diffraction efficiencies for an embodiment of a double-bar metasurface.
Figure 7:
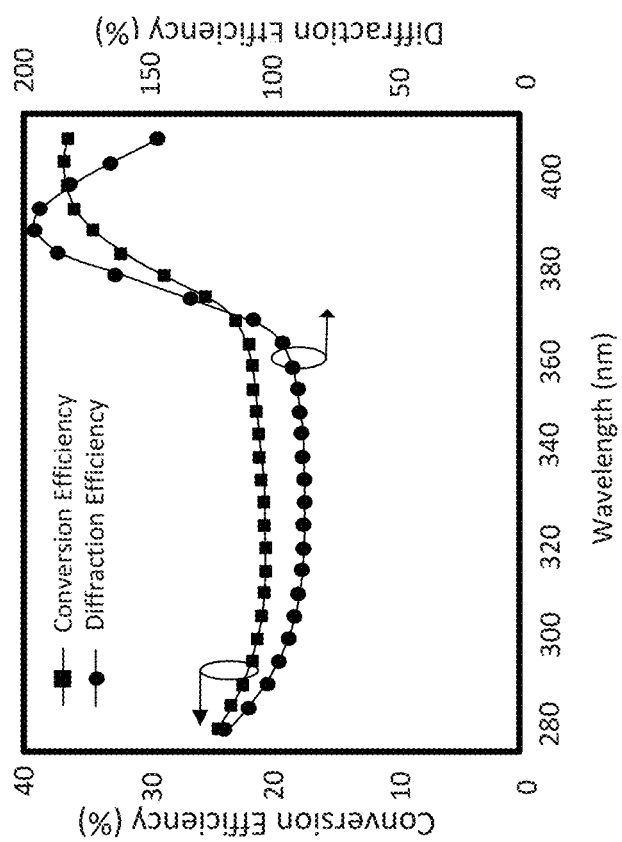

FIG. 7 shows a double bar embodiment, which increases the efficiency of the all-Si metasurface to a diffraction efficiency of 200% and a conversion efficiency of 37% in the transmission mode. This high diffraction efficiency will be essential to improve the signal-to-noise ratio in the far field transmission. The demonstration of effective UV beam steering successfully confirms the proposed mechanism that engineering material property improves the scattering efficiency due to the strong interaction between Si and UV light. Furthermore, the results also indicate that any material that has large permittivity, either real or imaginary part, in the UV range may also form effective UV metasurface devices.

Figure 8:
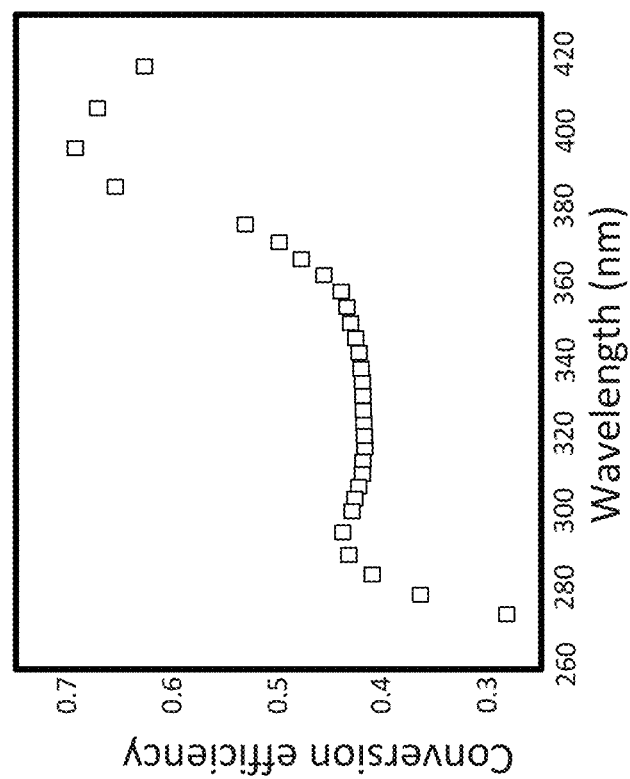
FIG. 8 shows a graph of calculated conversion efficiency for an embodiment of a reflective metasurface with a single-bar structure.
Figure 8:
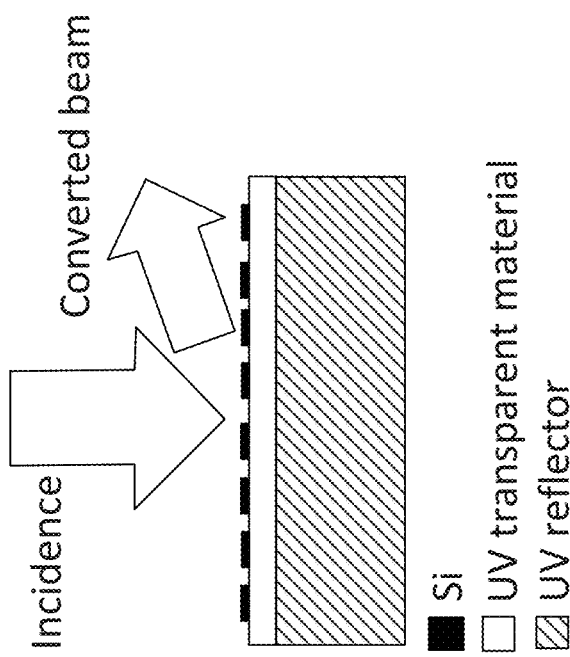

The discussion so far has focused on devices working in the transmission mode. FIG. 8 shows the simulated conversion efficiency of an embodiment of a reflective metasurface with a single-bar structure. The reflector can be either Aluminum or UV Bragg reflector. The spacer layer is around 30 nm thick, which is UV transparent. The overall conversion efficiency goes beyond 40% and the maximum efficiency reaches 70%. This reflection mode can be combined with either single-bar or double-bar designs.

FIGS. 9-15, for a single bar embodiment, and FIGS. 16-25, for a double bar embodiment, show an embodiment of a method to massively and cost-effectively fabricate metalenses and metasurfaces for hologram applications. One should note that these figures set out one embodiment of manufacturing processes and other manufacturing processes may be used to achieve the final results.

FIGS. 9-11 show the initial process that can form either a single bar or a double bar structure, with a silicon on insulator (SOI) substrate with device layer thickness of ~35 nm. The SOI device has a layer of Si 14 on an insulator 12, such as $SiO_2$, on a Si substrate 10. The process places the device layer face down, on a UV-transparent substrate 16, such as quartz, another silicon based material ($SiO_2$) and bonded to it at a high pressure. The backside of SOI wafer, the Si substrate 10 is removed. In one embodiment the removal occurs with the combination of mechanical polishing and chemical etching. The oxide layer 12 is etched away with hydrogen fluoride. At this point the two processes diverge.

Figure 15:
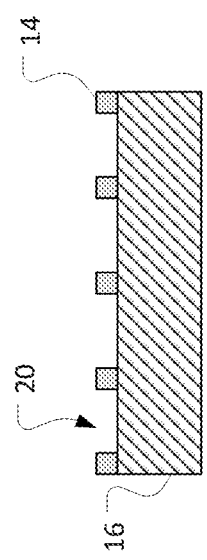
Figure 18:
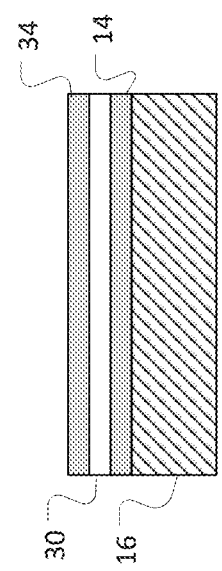
Figure 17:
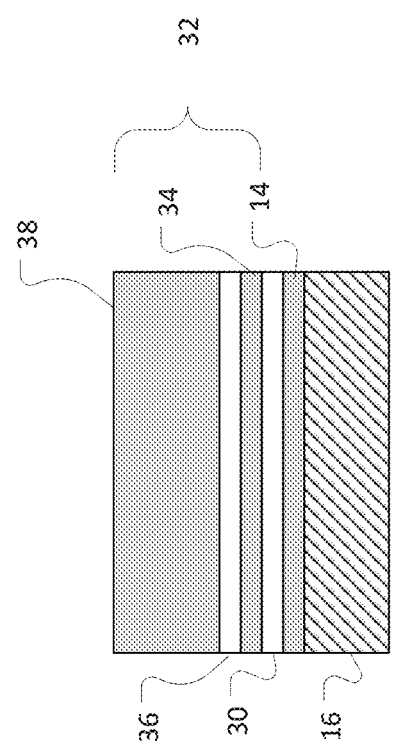
Figure 19:
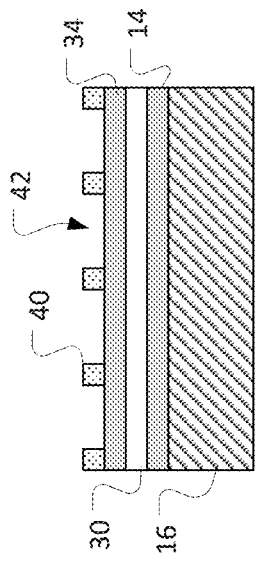
Figure 20:
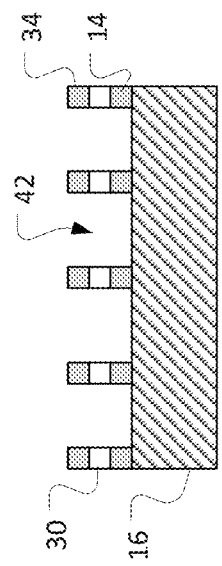

FIGS. 12-15 show the remaining process for single-layer Si devices. FIG. 12 shows deposition of a layer of photo-resist 18, such as by spin-coating. This layer then undergoes patterning in FIG. 13 to form a pattern of areas of resist 18 and voids such as 20. The silicon layer 14 then undergoes etching to form a pattern of areas of silicon 14 and resist 18, and the voids such as 20 have become deeper, in FIG. 14. In FIG. 15, the resist has been removed, leaving single bar, nanorod antennas formed form silicon layer 14 on the UV transparent substrate 16.

Figure 16:
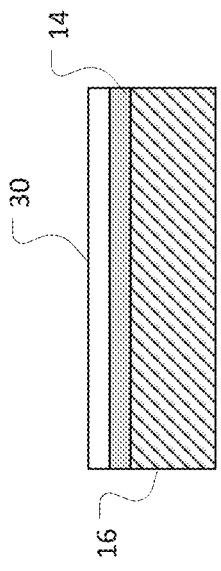
FIGS. 16-22 show an embodiment of a process of manufacturing an embodiment of a double bar metasurface.
Figure 21:
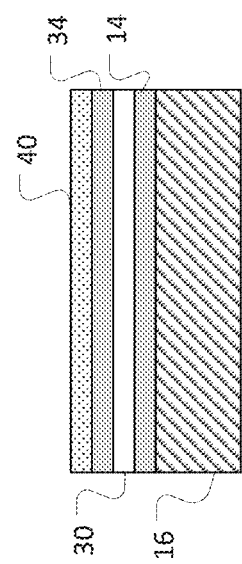
Figure 22:
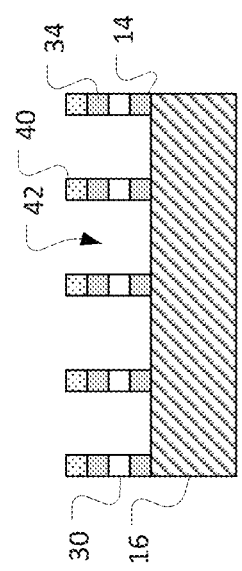

Turning to the double bar embodiments after the common process between the two, FIG. 16 shows a layer of insulator 30 deposited on the silicon layer 14. Another SOI wafer 32 is then wafer bonded to the insulator layer 30 in FIG. 17. The SOI wafer 32 has a silicon layer 34 on an insulator layer 36, on the silicon substrate 38. The silicon wafer 38 and the insulator layer 36 are removed in accordance with the processes above, or other processes of removal, in FIG. 18. The double stacked device then receives a layer of resist 40 in FIG. 19. The layer of resist undergoes patterning and removal in FIG. 20, leaving areas of resist 40 and voids such as 42. In FIG. 21, the silicon layers 34 and 14, and the insulator 30, are etched. This results in the final pattern of double bar antenna shown in FIG. 21, still with the layer of resist. FIG. 22 shows the final result of a set of double bar antenna.

In summary, the single and double bar embodiments both consist of forming at least one silicon layer on the UV transparent substrate and then patterning and etching the at least one silicon layer to form nanorod antennas, either single or double bar.

Regarding the massive fabrication of the reflective metasurfaces, only replacement of UV transparent substrate with UV reflective substrate and deposition of ~30 nm thick UV transparent material, such as $SiO_2$, are required. As used here, the term "UV responsive" means that a material is either UV reflective or UV transparent.

In this manner, one can provide an all-Si metasurface usable as a UV lens, with a thickness much less than conventional lenses. The lenses have high diffraction efficiency and conversion efficiency and are easy to manufacture relative to conventional lenses. In addition, other materials with large permittivity of UV light may also be used. Both transmission or reflection modes can be designed and fabricated for specific applications.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A device, comprising:
   a substrate transparent to ultraviolet (UV) light; and
   at least one metalens comprising a layer of an array of nanorods formed of a material having a permittivity of UV light of at least 10 on the substrate, the at least one metalens having a thickness smaller than a working wavelength, the working wavelength being between 290 nm and 410 nm.

2. The device of claim 1, wherein the substrate comprises quartz.

3. The device of claim 2, wherein the entire device is comprised of silicon-based materials.

4. The device of claim 1, wherein the material having the permittivity of UV light of at least 10 comprises one of a material selected from a group consisting of: silicon, silicon dioxide, and silicon carbide.

5. The device of claim 1, wherein the at least one metalens comprises a layer of silicon having a thickness of less than 35 nm.

* * * * *